United States Patent [19]

Ishida et al.

[11] Patent Number: 5,214,463
[45] Date of Patent: May 25, 1993

[54] FOCAL PLANE SHUTTER

[75] Inventors: Hiroaki Ishida; Ichiro Nemoto; Hiroyuki Izumi, all of Yotsukaido, Japan

[73] Assignee: Seikosha Co., Ltd., Japan

[21] Appl. No.: 677,784

[22] Filed: Mar. 29, 1991

[30] Foreign Application Priority Data

Mar. 30, 1990 [JP] Japan ................................ 2-35262[U]

[51] Int. Cl.⁵ ................................................ G03B 9/40
[52] U.S. Cl. ......................................................... 354/247
[58] Field of Search .................................. 354/245-249

[56] References Cited

U.S. PATENT DOCUMENTS 4,081,810 3/1978 Onda et al. .......................... 354/246
4,306,798 12/1981 Uchiyama et al. ................... 354/246

*Primary Examiner*—Donald A. Griffin
*Assistant Examiner*—David M. Gray
*Attorney, Agent, or Firm*—Bruce L. Adams; Van C. Wilks

[57] ABSTRACT

A focal plane shutter has at least one shutter blade group comprised of a leading blade and a set of trailing blades. A first parallel link mechanism is pivotally connected at two spaced locations to the leading blade to effect displacement of the leading blade relative to a shutter opening. A second parallel link mechanism is pivotally connected at two or more spaced locations to the set of trailing blades to effect displacement of the trailing blades relative to the shutter opening. The distance between the two pivotal connections of the first parallel link mechanism is greater than the distance between the at least two pivotal connections of the second parallel link mechanism.

15 Claims, 2 Drawing Sheets

FOCAL PLANE SHUTTER

BACKGROUND OF THE INVENTION

The present invention relates to a focal plane shutter for a camera, wherein a set of opening shutter blades and a set of closing shutter blades are operable to open and close a shutter opening.

Conventional camera shutters include a focal plane shutter arranged in front of a film loaded in a camera. There has recently been a need for a lightweight, compact camera. To meet this need, such a conventional focal plane shutter includes a set of superposed opening shutter blades, and a set of superposed closing shutter blades. The opening shutter blades are operable to open a shutter opening. When a predetermined time has passed, the closing shutter blades are operable to close the shutter opening. The opening shutter blades and the closing shutter blades thus cooperate to obtain the proper exposure.

Such a focal plane shutter is illustrated, for example, in FIGS. 2 and 3. In FIGS. 2 and 3, the reference numeral 101 is a cover plate attached to a base plate 102. A set of opening shutter blades 103 and a set of closing shutter blades 104 are assembled between the base plate 102 and the cover plate 101. These sets of opening shutter blades and closing shutter blades 103 and 104 are composed of a plurality of shutter blades which are connected to one end of driving arms 105 and 106 and auxiliary arms 107 and 108. The other end of the driving arms 105 and 106 and the auxiliary arms 107 and 108 are pivotally mounted to the base plate 102.

With the prior art focal plane shutter, a first shutter blade 103a of the opening shutter blades 103 and a first shutter blade 104a of the closing shutter blades 104, one side of which define a shutter opening, are mounted so as not to interfere with pivotal pins 115 and 116 by which second shutter blades are pivotally connected to links. However, this arrangement limits reduction of a space (length L in FIG. 2) defined leftwardly of the shutter opening 120 in the cover plate 101 and thus, limits the size of reduction of the overall unit.

In order to overcome the foregoing problem, there was proposed a focal plane shutter as shown in Japanese utility model publication No. 57367/82. In such a shutter, however, the second shutter blades are supported by elements which are attached to parallel arms. This prevents smooth operation of the shutter and makes it difficult to fabricate the same.

Again, in the prior art focal plane shutter shown in FIG. 2, if the pivotal pins 115 and 116 are mounted closer to adjacent pivot pins 117 and 118 so as to reduce the length L or the space, then the first shutter blades 103a and 104a may not be moved in parallel as they should be. This may adversely affect the configuration of the shutter opening and consequent exposure operation.

SUMMARY OF THE INVENTION

Accordingly, the present invention has as its object to solve the foregoing problems.

In order to solve these problems, the present invention provides a focal plane shutter including two sets of shutter blades, supported sidewardly of a shutter opening, by parallel link mechanisms and operable to open and close the shutter opening, characterized in that a first shutter blade is operable by a first parallel link mechanism so as to open the shutter opening, and a second shutter blade is operable by a second parallel link mechanism and arranged in superposed relation to the first shutter blade, the first and second shutter blades constituting one set of shutter blades, and that the distance between connections of the first parallel link mechanism and the first shutter blade is greater than the distance between connections of the second parallel link mechanism and the second shutter blade.

In this focal plane shutter, the first shutter blade is connected to the first parallel link mechanism in addition to the second parallel link mechanism being connected to the second shutter blade, and the distance between connections of the first parallel link mechanism is greater than that between connections of the second parallel link mechanism. This positively ensures parallel movement of the first shutter blade in the set of shutter blades, and also enables reduction of the length L or the space shown in FIG. 2 and thus, the total size of the shutter.

DETAILED DESCRIPTION OF THE INVENTION

Figure 1:
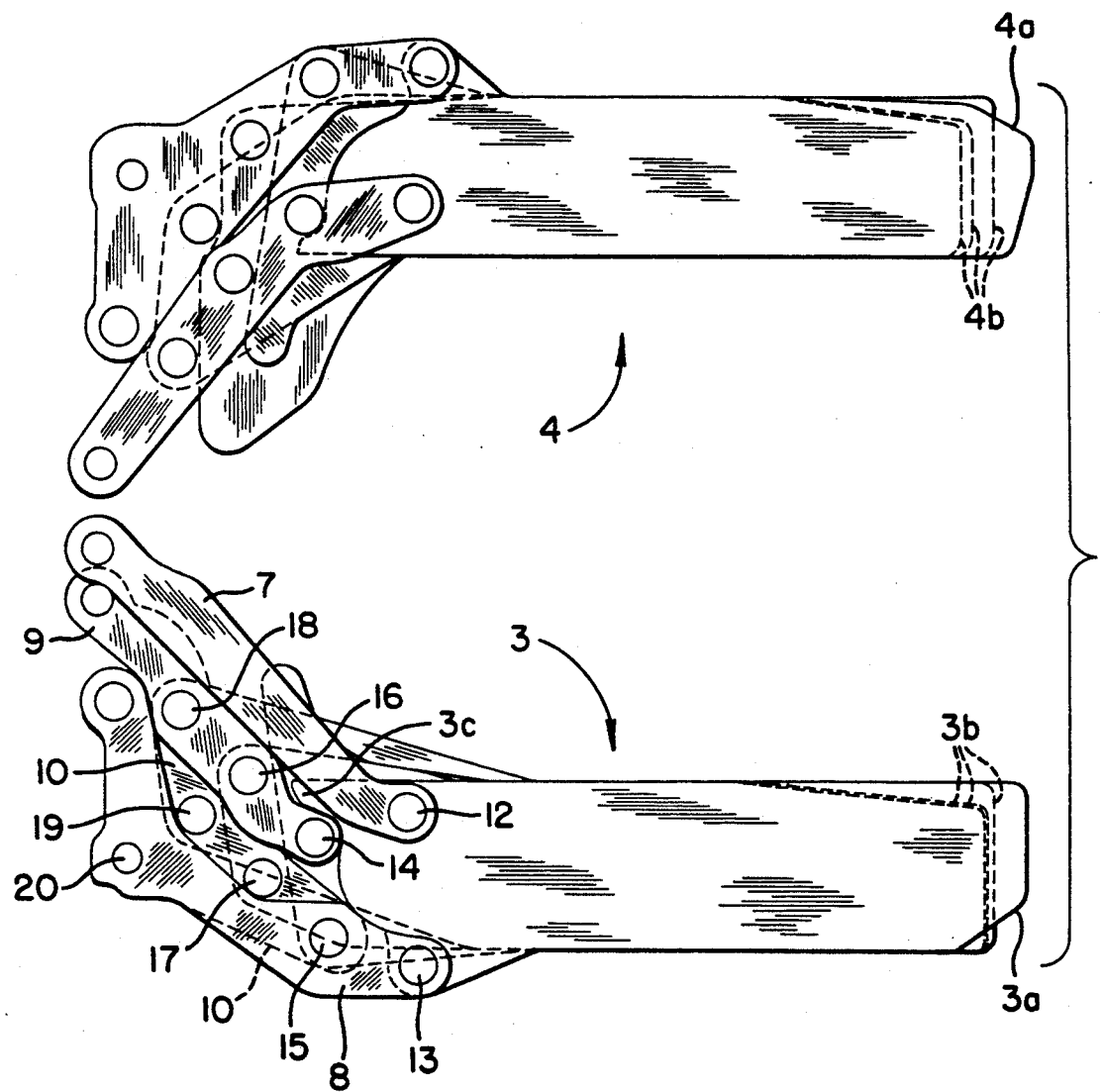
FIG. 1 is a front view of a focal plane shutter according to one embodiment of the present invention.

The present invention will now be described by way of example with reference to the drawings. FIG. 1 shows a focal plane shutter according to one embodiment of the present invention.

In FIG. 1, the reference numeral 3 denotes a group of opening shutter blades attached to a base plate (not shown). A group of closing shutter blades 4 is similarly attached to the base plate. These groups of shutter blades 3 and 4 are both composed of a plurality of shutter blades. Specifically, the two shutter blade groups 3 and 4 include first or leading shutter blades 3a and 4a, one side of each being designed to form a shutter opening, and second or trailing shutter blades 3b and 4b arranged in superposed relation to the first shutter blades 3a and 4a, respectively.

The first shutter blade 3a of the opening shutter blade set 3 is connected through pivotal pins 12 and 13 to one end of two arms 7 and 8 which constitute a first parallel link mechanism. The other end of each of the arms 7 and 8 is connected to the base plate (not shown). The set of trailing or second shutter blades 3b is connected through pivotal pins 14 to 19 to one end of two arms 9 and 10 which constitute a second parallel link mechanism. The other ends of the arms 9 and 10 are pivotally connected to the base plate (not shown).

The arm 8 is connected to a drive member (not shown) by a pivotal pin 20. The drive member is operable to move the first shutter blade 3a and the second shutter blade 3b so as to open and close the shutter opening through the pivotal pins 13, 15, 17 and 19 while the first and second shutter blades 3a and 3b are displaced relative to one another.

The leading or first shutter blade 4a and the set of trailing or second shutter blades 4b of the closing shutter blade group 4 are arranged in a manner similar to those in the prior art unit or mounted to the base plate, and are operated in an identical manner.

In the illustrated embodiment, the arms 8 and 10 are separate members. Alternatively, these arms, if made as a one-piece arm, can provide the same advantageous effects.

With this focal plane shutter, the distance between pivotal connections of the first parallel link mechanism (distance between the pivotal pins 12 and 13 in the opening shutter blade group 3) is greater than that between pivotal connections of the second parallel link mechanism (distance between, the pivotal pins 14 and 5 in the opening shutter blade group 3). This arrangement ensures parallel movement of the first shutter blades 3a and 4a of the shutter blade groups 3 and 4 so as to obtain the proper exposure. As to the second shutter blades 3b and 4b, the distance between the pivotal connetions of the second parallel link mechanism is rather short. This may slightly deteriorate parallel movement of the second shutter blades 3b and 4b, but would not adversely affect the exposure operation since they do not directly form the shutter opening.

Figures 2, 3:
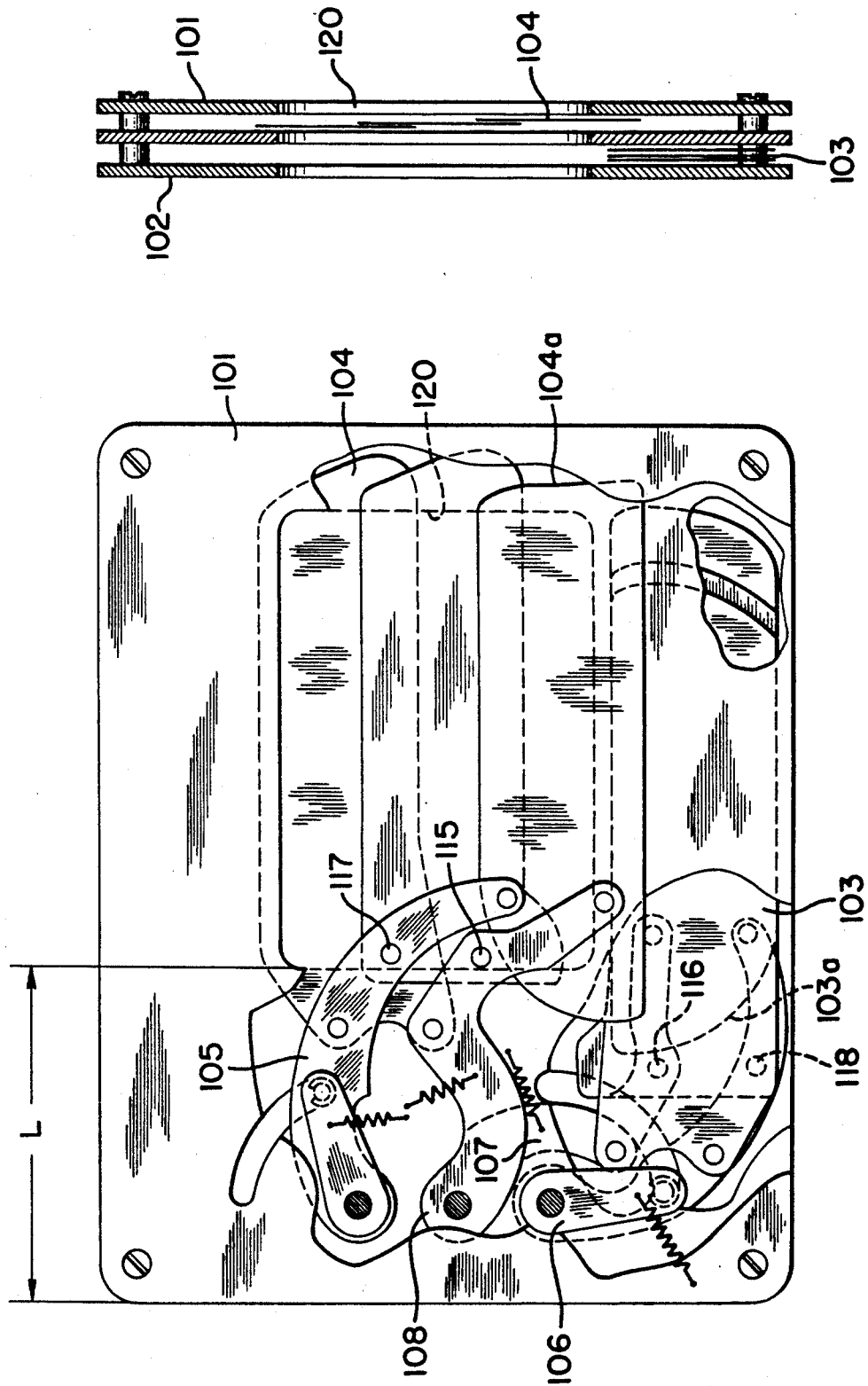
FIGS. 2 and 3 are front and sectional side view of a conventional focal plane shutter.

As illustrated, the pivotal pin 14 is mounted downwardly of the pivotal pin 12 so as not to interfere with an end 3c of the first shutter blade 3a, the side of which defines the shutter opening. This results in a decrease in the length L of the space shown in FIG. 2, and thus the size of the overall unit, and it eliminates unnecessary spaces between that side of the first shutter blade 3a and the pivotal pin 12.

The shutter may be brought into a compact arrangement without locating the pivotal pin 15 below the pivotal pin 13. This prevents an increase in the size of a camera.

Additionally, with an increase in the distance between the pivotal connections of the first parallel link mechanism, the pivotal pins 12 and 13 of the arms 7 and 8 are in no way subject to inertial load due to the first shutter blade 3a. This improves the durability of the shutter.

As stated above, the present invention ensures parallel movement of the shutter blade groups and effectively enables reduction of the size of the shutter.

Additionally, the distance between the pivotal connections of the first parallel link mechanism is made longer. As such, the pivotal pins in the arm are in no way subject to inertial load due to the first shutter blade. This results in an increase in the durability of the shutter.

We claim:

1. A focal plane shutter comprising: two sets of shutter blades supported sidewardly of a shutter opening by parallel link mechanisms and operable to open and close the shutter opening, wherein one of the sets of shutter blades comprises a first shutter blade operable by a first parallel link mechanism to open the shutter opening, and a second shutter blade operable by a second parallel link mechanism and arranged in superposed relation to said first shutter blade, and wherein the distance between connections of said first parallel link mechanism and said first shutter blade is greater than the distance between connections of said second parallel link mechanism and said second shutter blade.

2. A focal plane shutter according to claim 1; wherein one arm of the first parallel link mechanism and one arm of the second parallel link mechanism are constituted by a one-piece arm.

3. A focal plane shutter comprising: means defining a shutter opening; at least one shutter blade group comprised of a leading blade and a set of trailing blades; a first parallel link mechanism pivotally connected at two spaced locations to the leading blade to effect displacement of the leading blade relative to the shutter opening; a second parallel link mechanism pivotally connected at at least two spaced locations to the set of trailing blades to effect displacement of the set of trailing blades relative to the shutter opening; and wherein the distance between the two pivotal connections of the first parallel link mechanism is greater than the distance between the at least two pivotal connections of the second parallel link mechanism.

4. A focal plane shutter according to claim 3; including plural pairs of pivotal connections pivotally connecting the second parallel link mechanism to the set of trailing blades, the distance between each pair of pivotal connections being less than the distance between the two pivotal connections of the first parallel link mechanism.

5. A focal plane shutter according to claim 4; wherein the set of trailing blades comprises a plurality of trailing blades.

6. A focal plane shutter according to claim 4; including a base plate having the shutter opening extending therethrough; and means pivotally mounting the first and second parallel link mechanisms to the base plate.

7. A focal plane shutter according to claim 4; wherein the first and second parallel link mechanisms are superposed one over the other.

8. A focal plane shutter according to claim 4; wherein the first and second parallel link mechanisms each have two arms, the two arms of each mechanism being pivotally connected at one of their ends to one of the blades.

9. A focal plane shutter according to claim 3; wherein the set of trailing blades comprises a plurality of trailing blades.

10. A focal plane shutter according to claim 3; including a base plate having the shutter opening extending therethrough; and means pivotally mounting the first and second parallel link mechanisms to the base plate.

11. A focal plane shutter according to claim 3; wherein the first and second parallel link mechanisms are superposed one over the other.

12. A focal plane shutter according to claim 3; wherein the first and second parallel link mechanisms each have two arms, the two arms of each mechanism being pivotally connected at one of their ends to one of the blades.

13. A focal plane shutter according to claim 3; including two shutter blade groups each having leading and trailing blades pivotally connected to first and second parallel link mechanisms as defined in claim 2.

14. A focal plane shutter according to claim 13; wherein one of the shutter blade groups comprises an opening group positioned to effect opening of the shutter opening and the other shutter blade group is a closing group positioned to effect closing of the shutter opening.

15. A focal plane shutter according to claim 14; wherein the set of trailing blades in both the opening and closing blade groups comprises a plurality of trailing blades.

* * * * *